(12) United States Patent
Eloff et al.

(10) Patent No.: US 12,325,272 B2
(45) Date of Patent: Jun. 10, 2025

(54) REAR SUSPENSION ASSEMBLY

(71) Applicant: The Shyft Group, Inc., Charlotte, MI (US)

(72) Inventors: Johann Pieter Eloff, Fort Wayne, IN (US); Heinz Hentschel, Belleville, MI (US); Douglas E. Peirce, West Bloomfield, MI (US)

(73) Assignee: The Shyft Group, Inc., Charlotte, MI (US)

( * ) Notice: Subject to any disclaimer, the term of this patent is extended or adjusted under 35 U.S.C. 154(b) by 0 days.

(21) Appl. No.: 18/594,086

(22) Filed: Mar. 4, 2024

(65) Prior Publication Data

US 2024/0294046 A1 Sep. 5, 2024

Related U.S. Application Data

(60) Provisional application No. 63/449,739, filed on Mar. 3, 2023.

(51) Int. Cl.
*B60G 11/12* (2006.01)

(52) U.S. Cl.
CPC .......... *B60G 11/12* (2013.01); *B60G 2202/11* (2013.01); *B60G 2204/121* (2013.01)

(58) Field of Classification Search
CPC ............... B60G 11/12; B60G 2202/11; B60G 2204/121; B60G 11/04; B60G 11/10; B60G 2202/112
See application file for complete search history.

(56) References Cited

U.S. PATENT DOCUMENTS

| 1,749,846 | A | * | 3/1930 | Roos | B60G 11/12 |
| | | | | | 267/267 |
| 4,103,932 | A | * | 8/1978 | Parker | B60G 9/003 |
| | | | | | 267/271 |
| 4,919,399 | A | * | 4/1990 | Selzer | B60G 11/04 |
| | | | | | 267/31 |
| 6,209,897 | B1 | * | 4/2001 | Bundy | F16F 1/28 |
| | | | | | 267/260 |
| 6,273,441 | B1 | * | 8/2001 | Neavitt | F16F 1/26 |
| | | | | | 267/48 |
| 7,722,065 | B2 | * | 5/2010 | Platner | B60G 11/10 |
| | | | | | 267/260 |
| 10,370,033 | B1 | * | 8/2019 | Klein | B62D 21/20 |
| 10,500,913 | B1 | * | 12/2019 | Whitney | B60G 5/047 |
| 11,597,246 | B1 | * | 3/2023 | Klein | B60G 11/465 |
| 11,752,822 | B1 | * | 9/2023 | Leith | B60G 15/067 |
| | | | | | 280/680 |
| 2004/0004335 | A1 | * | 1/2004 | Rudder | B62D 13/04 |
| | | | | | 280/86.751 |
| 2005/0077665 | A1 | * | 4/2005 | Platner | B60G 11/10 |
| | | | | | 267/229 |

(Continued)

*Primary Examiner* — Paul N Dickson
*Assistant Examiner* — Shams Dhanani
(74) *Attorney, Agent, or Firm* — Barnes & Thornburg LLP

(57) ABSTRACT

A vehicle chassis with a first frame rail and a second frame rail. There is rear suspension with a first leaf spring and a second leaf spring each pivotally connected to the first and second frame rails, respectively. In some embodiments, the rear suspension includes a first shackle assembly connecting the first leaf spring with the first frame rail such that the first shackle straddles the first leaf spring, and a second shackle assembly similarly straddling the second leaf spring.

5 Claims, 11 Drawing Sheets

(56) References Cited

U.S. PATENT DOCUMENTS

| | | | | |
|---|---|---|---|---|
| 2007/0145706 A1* | 6/2007 | Penzotti | B60G 17/023 | 280/124.17 |
| 2007/0187920 A1* | 8/2007 | Furman | B60G 11/12 | 29/784 |
| 2007/0262547 A1* | 11/2007 | Warinner | B60G 21/0551 | 280/124.17 |
| 2008/0036182 A1* | 2/2008 | Fenton | B60G 11/12 | 280/682 |
| 2009/0039611 A1* | 2/2009 | Johns | B60G 11/12 | 280/124.175 |
| 2009/0194962 A1* | 8/2009 | Simard | B60G 11/04 | 280/124.111 |
| 2011/0175314 A1* | 7/2011 | Ohra-Aho | B60G 21/051 | 280/124.106 |
| 2012/0098229 A1* | 4/2012 | Hochapfel | B60G 11/107 | 280/124.134 |
| 2014/0035248 A1* | 2/2014 | Dilworth | B60G 11/04 | 280/124.17 |
| 2014/0117639 A1* | 5/2014 | Ramsey | B60G 9/04 | 280/124.11 |
| 2015/0014951 A1* | 1/2015 | McGuire | B60G 17/005 | 280/86.5 |
| 2015/0273941 A1* | 10/2015 | Mater, Jr. | B60B 35/007 | 29/401.1 |
| 2020/0017142 A1* | 1/2020 | Buchwitz | B60G 3/202 | |
| 2020/0047578 A1* | 2/2020 | Wieczorek | F16F 1/3835 | |
| 2024/0294046 A1* | 9/2024 | Eloff | B60G 11/12 | |

\* cited by examiner

REAR SUSPENSION ASSEMBLY

RELATED APPLICATIONS

This application claims the benefit of U.S. Provisional Application Ser. No. 63/449,739 filed Mar. 3, 2023, which is hereby incorporated by reference in its entirety.

TECHNICAL FIELD

This disclosure relates generally to a chassis for a vehicle; in particular, this relates to a chassis with a rear suspension for a commercial vehicle, such as a Class 3, 4, and/or 5 vehicle, which could be an electric vehicle (EV) or a vehicle with an internal combustion engine, such as a delivery truck, walk-in van, mobile retail vehicle, recreational vehicle, etc.

BACKGROUND

Many commercial vehicles have a frame with a standard rear width between frame rails of typically about 34 inches (about 86.36 cm). Even though there is a standard frame width size for these types of vehicles, there may be circumstances where a wider frame could be beneficial. For example, electric vehicles (EVs) include battery packs that come in a variety of sizes. However, the standard frame width size limits the number of battery pack sizes that the frame can accommodate. Vehicles other than EVs may also benefit from a wider frame size. For example, a wider frame size may be beneficial to install devices of different sizes between the frame rails. In recreational vehicles (RVs), for example, it may be desirable to mount tanks or other devices between the frame rails that would not fit between frame rails of a standard width. However, there are obstacles to making the frame wider.

FIG. 1 is a diagrammatical top view of a prior art commercial vehicle's rear portion to show a typical rear suspension. As is typical, the vehicle includes a first frame rail 10a and second frame rail 10b that extend longitudinally approximately parallel to each other from a front portion 12 to a rear portion 14 of the vehicle. The rear suspension includes a first rear spring 16a connected to an outside surface of the first frame rail 10a with a first front hanger bracket 15a and rear hanger bracket 17a with shackle 18a. The rear suspension also includes a second rear spring 16b connected to an outside surface of the second frame rail 10b with a second front hanger bracket 15b and rear hanger bracket 17b with shackle 18b. Accordingly, the rear springs 16a, 16b, front hanger brackets 15a, 15b and rear hanger brackets 17a, 17b with shackles 18a, 18b are outside the frame rails 10a, 10b. The rear springs 16a, 16b, front hanger brackets 15a, 15b and rear hanger brackets 17a, 17b with shackles 18a, 18b are positioned between the frame rails 10a, 10b and the rear wheels 20a, 20b. Since the rear springs 16a, 16b, front hanger brackets 15a, 15b and rear hanger brackets 17a, 17b with shackles 18a, 18b, are between the frame rails 10a, 10b and the wheels 20a, 20b, there are difficulties increasing the width between the frame rails 10a, 10b because there is limited space between the frame rails 10a, 10b and wheels 18a, 18b. With the rear springs 16a, 16b, front hanger brackets 15a, 15b and rear hanger brackets 17a, 17b with shackles 18a, 18b between the frame rails 10a, 10b and rear wheels 20a, 20b, there is limited space to widening the distance between the frame rails 10a, 10b.

Therefore, there is a need to overcome one or more of these difficulties.

SUMMARY

Accordingly to one aspect, this disclosure provides a vehicle chassis with a first frame rail and a second frame rail. The second frame rail extends approximately parallel with the first frame rail. The chassis also includes a first left spring pivotally connected with the first frame rail and a second leaf spring pivotally connected with the second frame rail. In some cases, the first leaf spring extends longitudinally along an axis approximately parallel with a longitudinally extending axis of the first frame rail. In some embodiments, the second leaf spring extends longitudinally along an axis approximately parallel with a longitudinally extending axis of the second frame rail.

According to another aspect, this disclosure provides a vehicle chassis with a first frame rail and a second frame rail. The second frame rail extends approximately parallel with the first frame rail. There is a first leaf spring having a first end and a second end pivotally connected with the first frame rail and a second leaf spring having a first end and a second end pivotally connected with the second frame rail. In some cases, the chassis includes a first hanger bracket connecting the first end of the first leaf spring to the first frame rail and a second hanger bracket connecting the first end of the second leaf spring to the second frame rail. In some embodiments, the chassis includes a first shackle assembly connecting the second end of the first leaf spring with the first frame rail, wherein the first shackle straddles the first leaf spring and a second shackle assembly connecting the second end of the second leaf spring with the second frame rail, wherein the second shackle straddles the second leaf spring.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
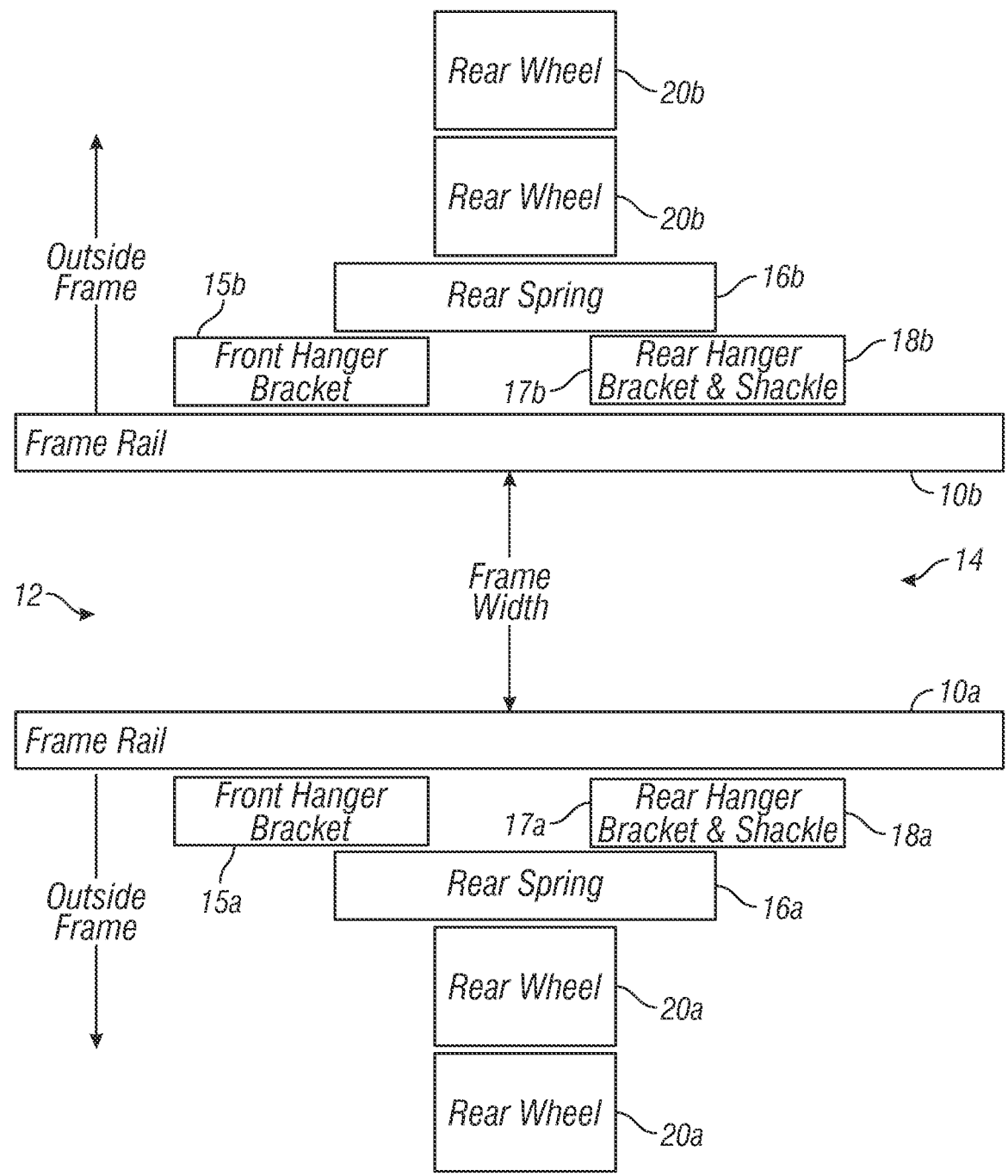
FIG. 1 is a top diagrammatic view showing the rear portion of a prior art commercial vehicle.
Figure 2:
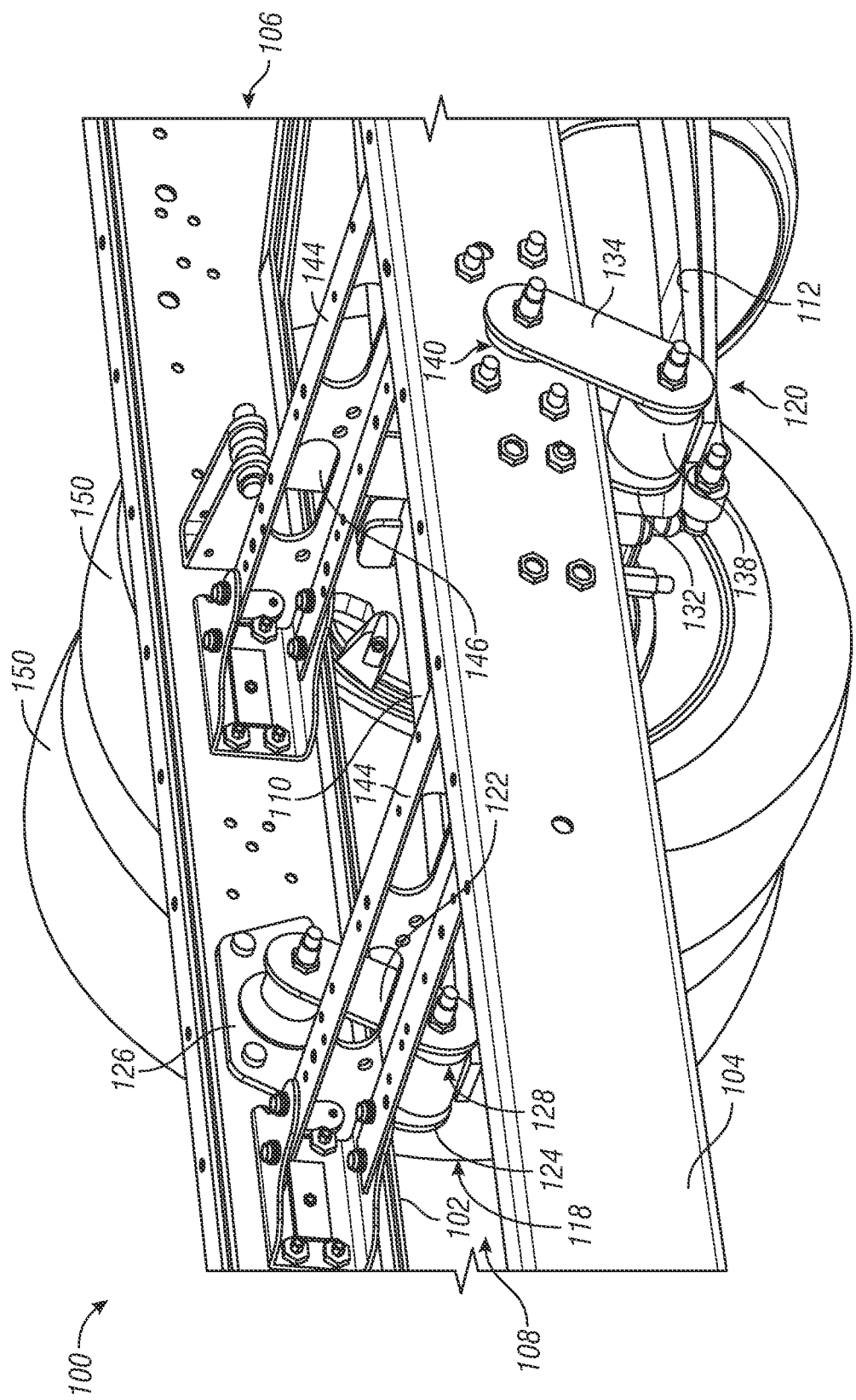
FIG. 2 is a detailed right side perspective view of a chassis with a rear suspension assembly according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure addresses a number of technical problems. As discussed herein, for example, this disclosure provides an improvement in vehicle chassis by providing a rear suspension assembly that allows the frame to be wider than prior art designs, which has benefits. For example, if the vehicle is an EV, this allows a wider variety of battery sizes to be accommodated between the frame rails where the batteries are protected from side-impact collisions. In some embodiments, the rear suspension's leaf springs are mounted below the frame rails and the shackles straddle the frame rails. This increases the available space between the frame rails and the rear wheels, such that the rear wheels can still be packaged as necessary for Class 4 and higher heavy-duty vehicles. With the available space between the frame and rear wheels increased by the rear suspension design, the distance between frame rails can be increased compared to the typical frame width, and thereby can accommodate various battery pack sizes.

Another advantage of embodiments having the rear springs below the frame rails is that the frame width can be constant throughout the length of the chassis. This allows a stronger and lighter chassis and enables easier and better dimensional accuracy of the frame during manufacture. With a constant frame width throughout the length of the chassis, the frame does not require an outboard offset feature to accommodate the battery pack width, which allows a shorter wheelbase length if desired. Additionally, in embodiments with the rear spring leaf below the frame rail and rear shackles straddling the frame rails, the frame height and body floor can be kept at a competitive height instead of needing to raise the height to accommodate the rear leaf springs.

Figure 3:
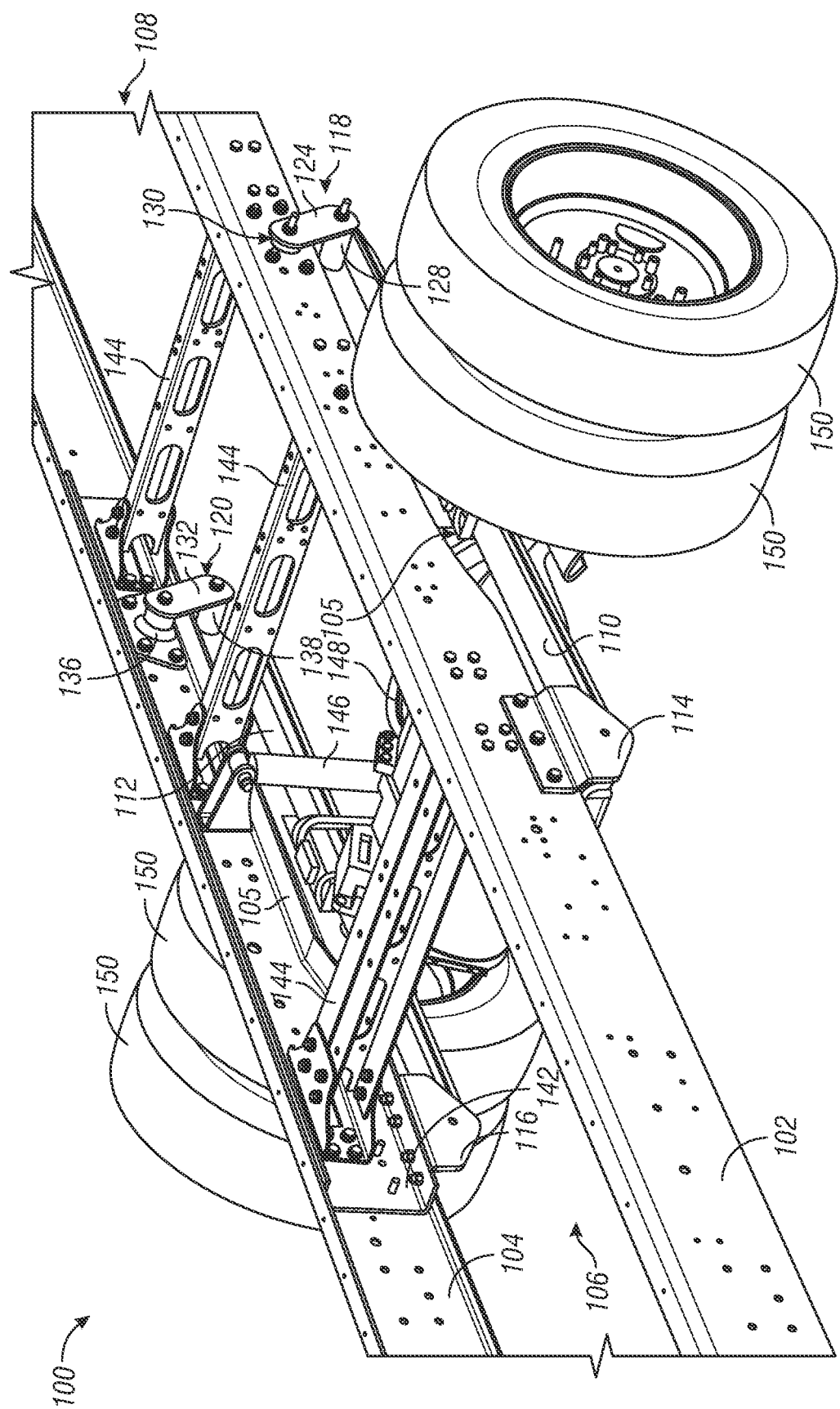
FIG. 3 is a left side perspective view of the chassis shown in FIG. 2.
Figure 4:
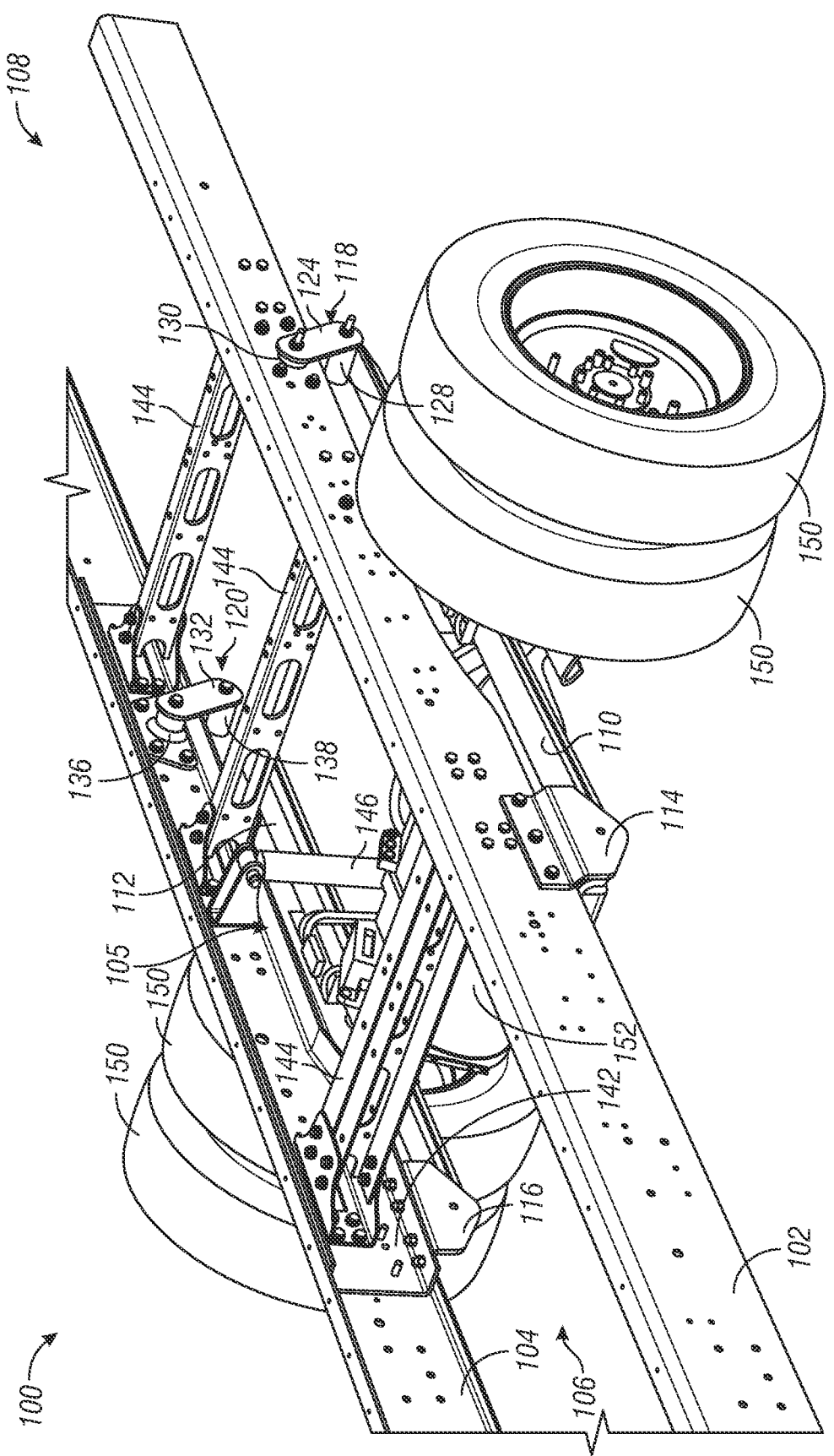
FIG. 4 is a left side perspective view of the chassis shown in FIG. 2.
Figure 5:
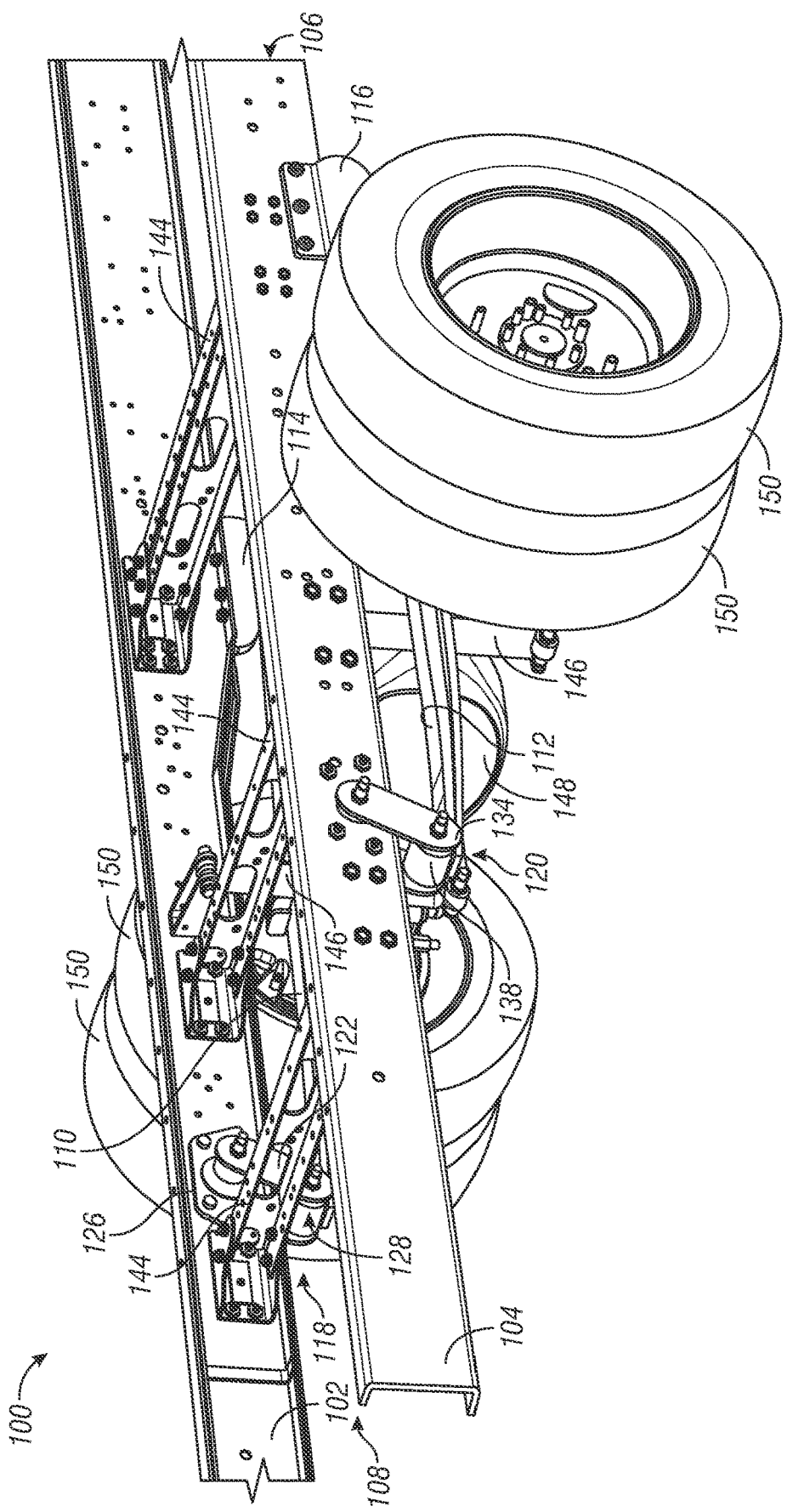
FIG. 5 is a right side perspective view of the chassis shown in FIG. 2.
Figure 6:
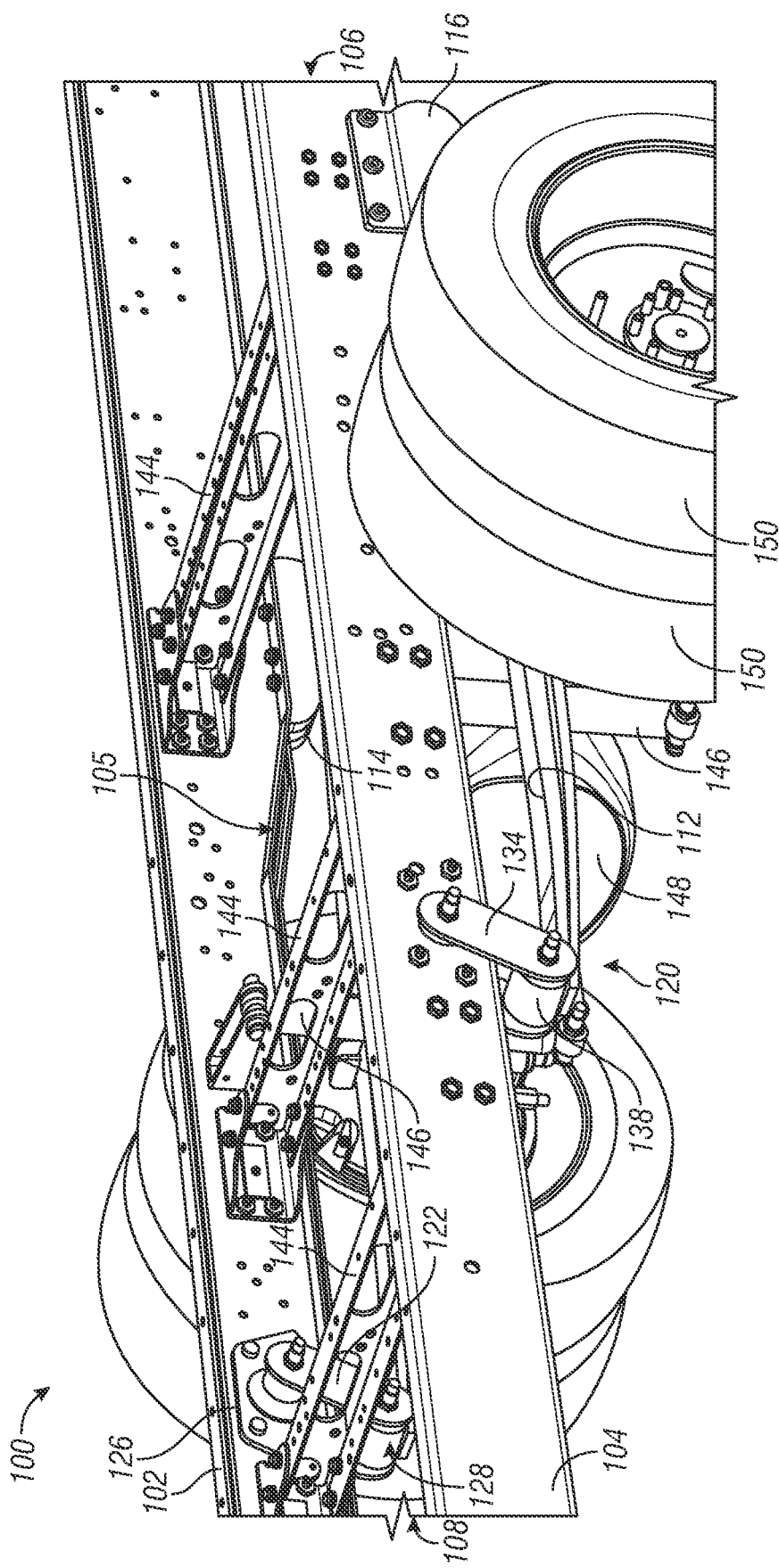
FIG. 6 is a detailed right side perspective view of the chassis shown in FIG. 2.
Figure 7:
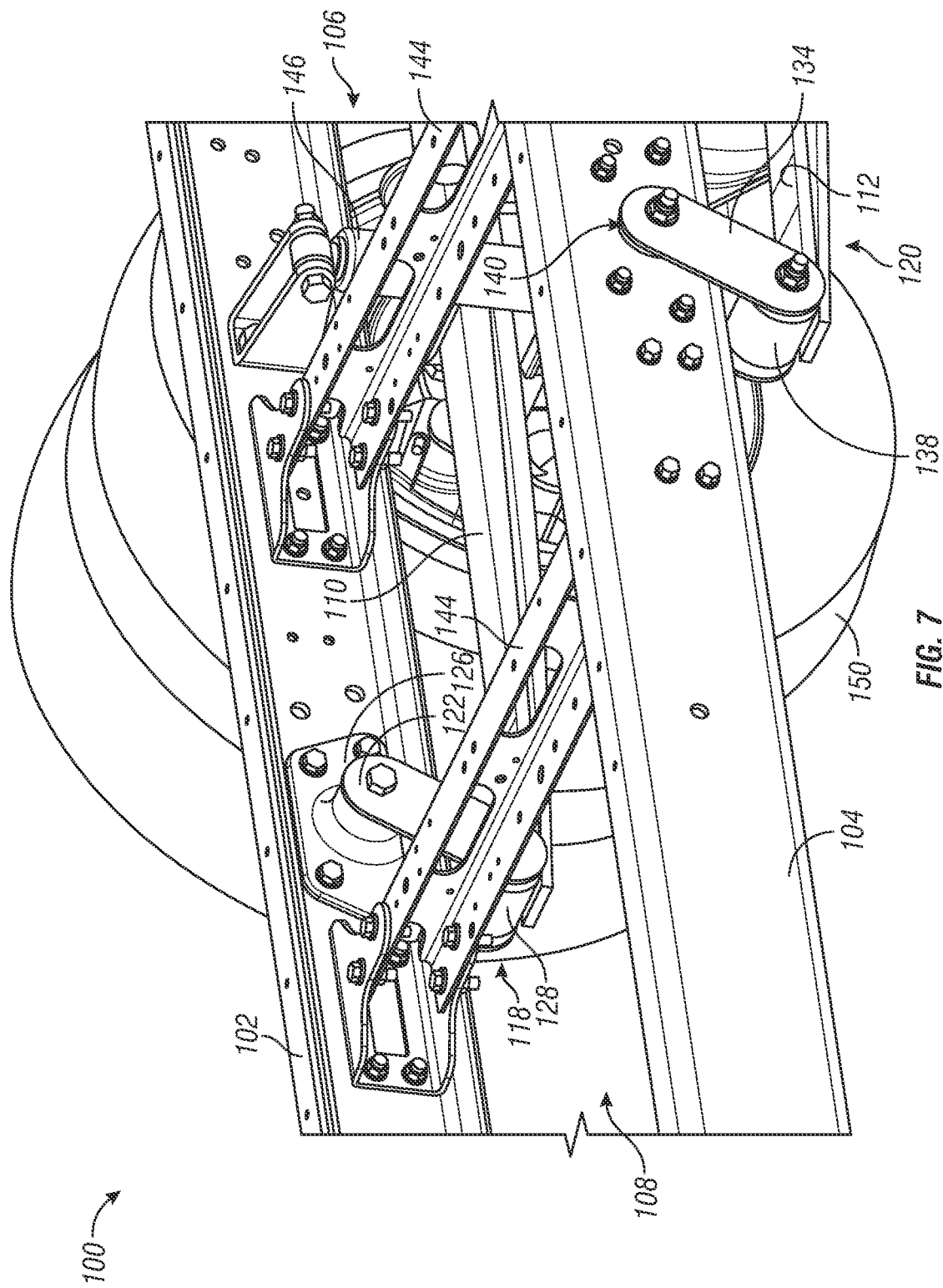
FIG. 7 is a detailed right side perspective view of the chassis shown in FIG. 2.
Figure 8:
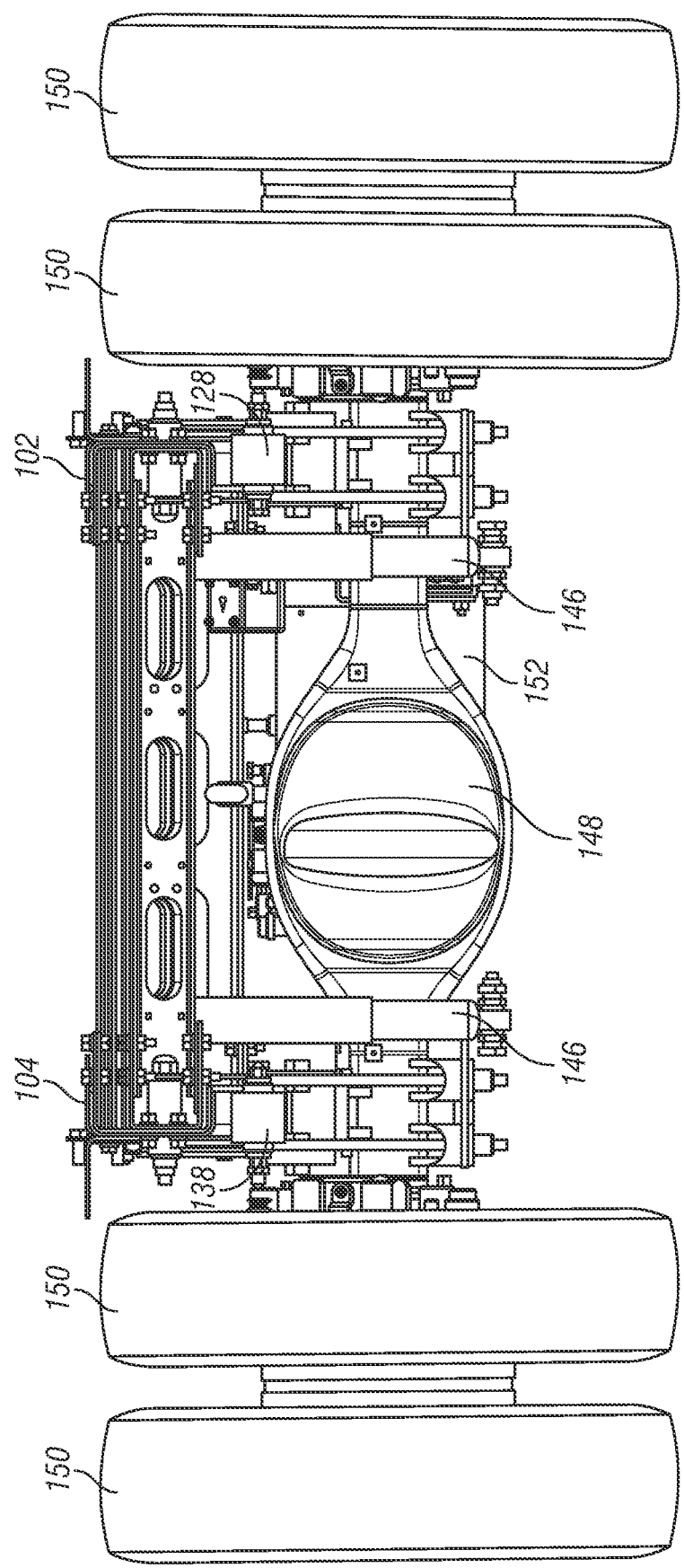
FIG. 8 is a rear view of the chassis shown in FIG. 2.
Figure 9:
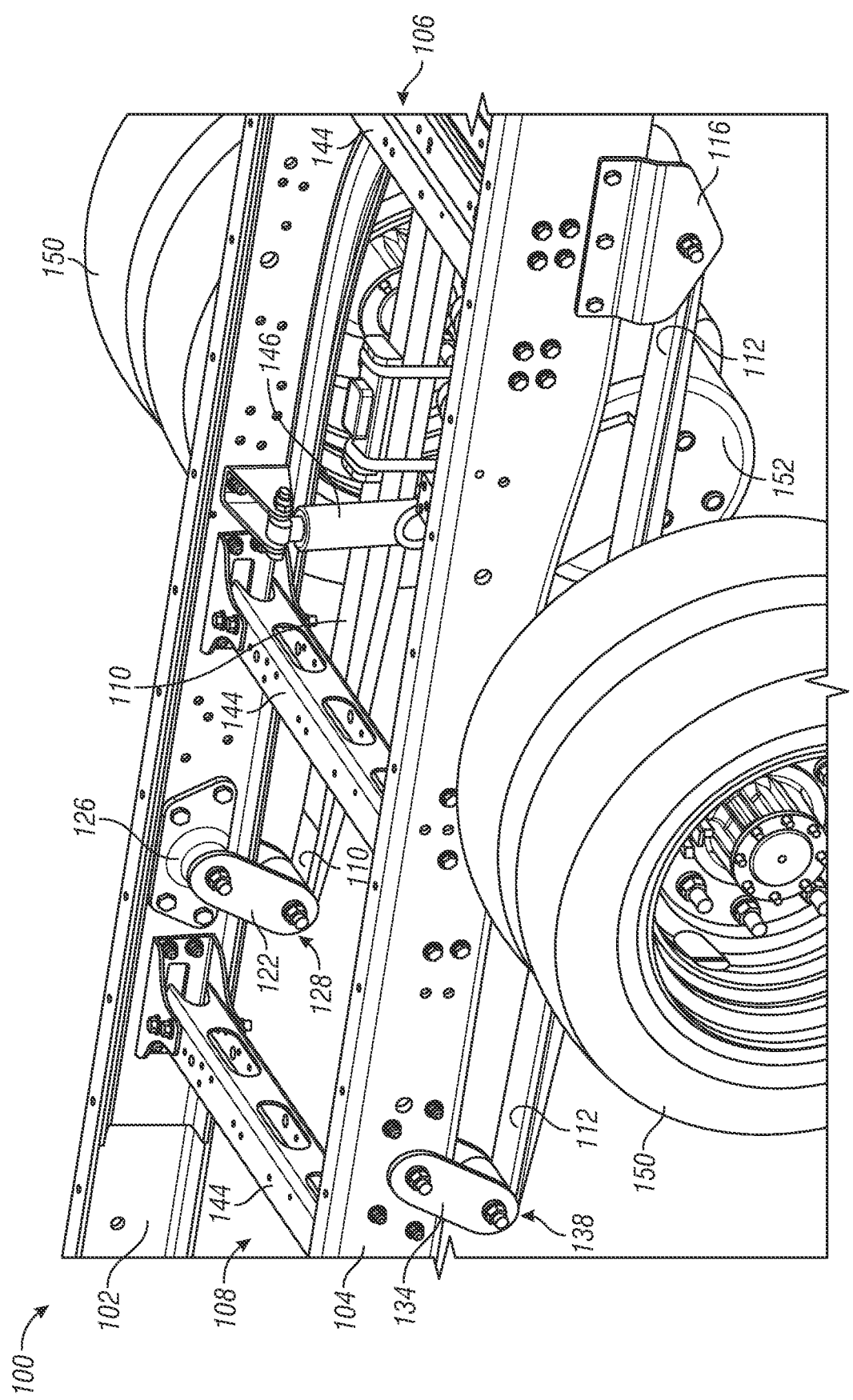
FIG. 9 is a right side perspective view of the chassis shown in FIG. 2.
Figure 10:
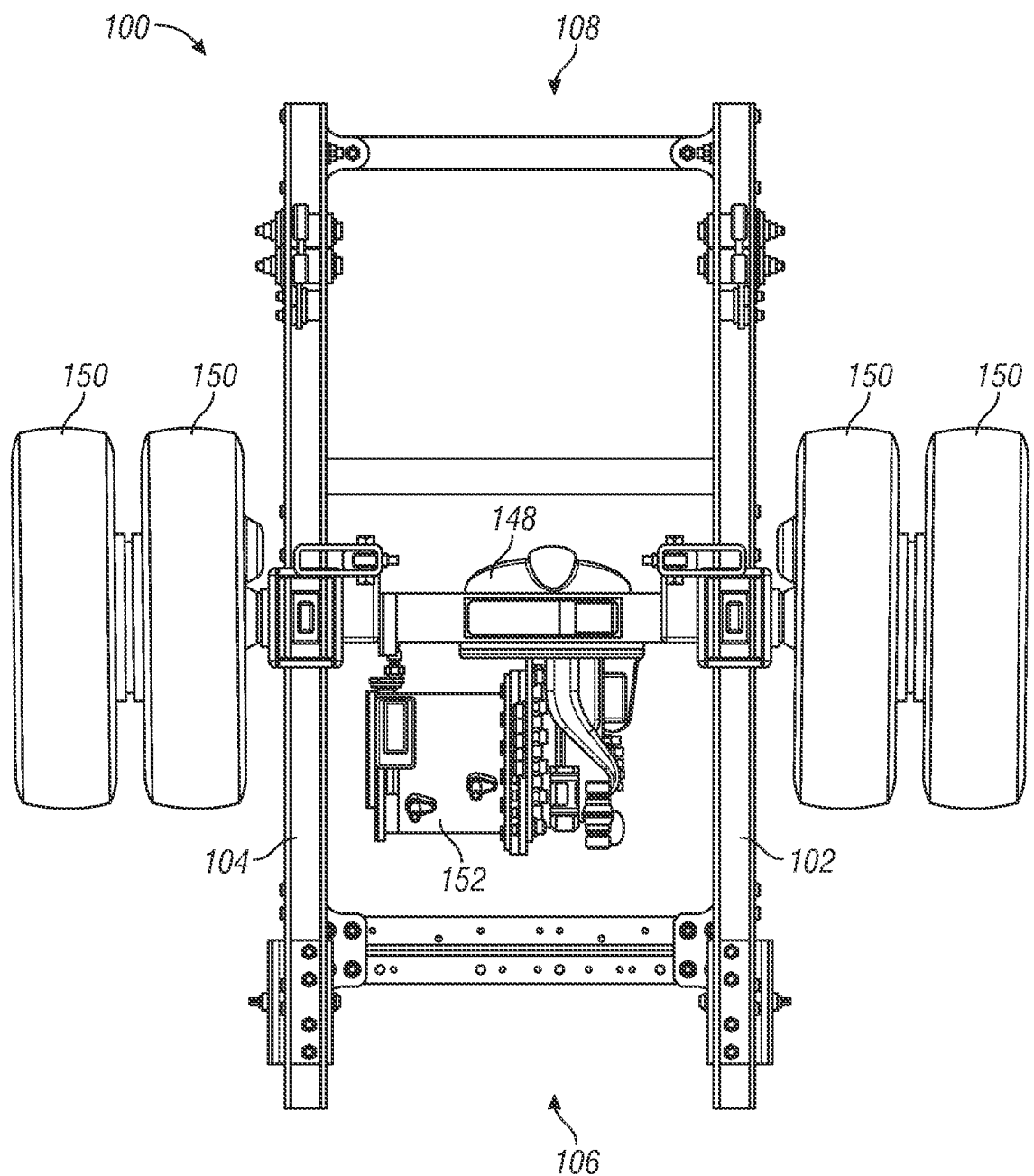
FIG. 10 is a top view of the chassis shown in FIG. 2.
Figure 11:
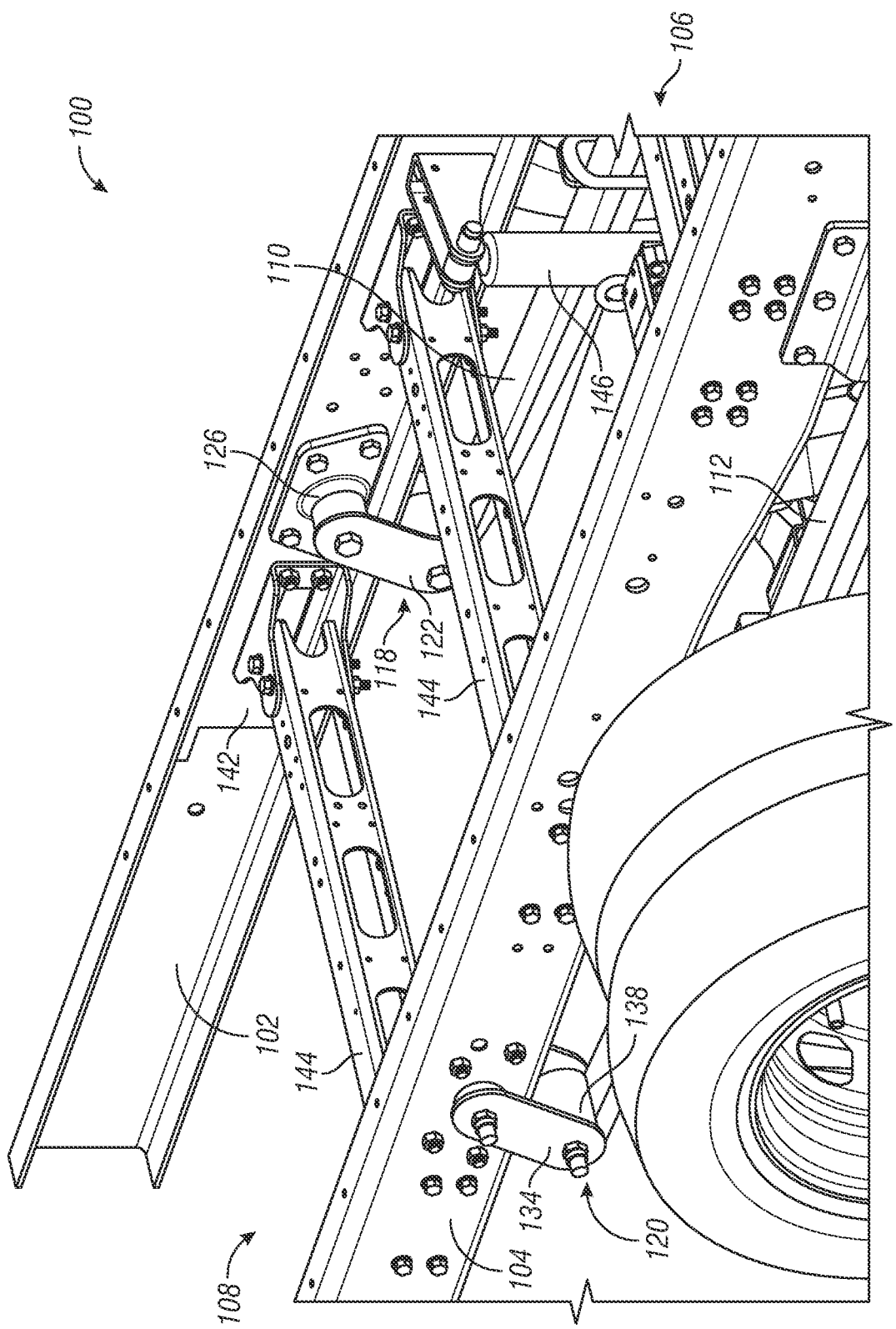
FIG. 11 is a right side perspective view of the chassis shown in FIG. 2.

Referring to FIGS. 2-11, there is shown the rear portion of an example vehicle chassis 100 according to an embodiment of this disclosure. In the embodiment shown, there is a first frame rail 102 and a second frame rail 104 that extend approximately in parallel to each other from a front portion 106 to a rear portion 108 of the chassis 100. In some embodiments, the distance between the first frame rail 102 and the second frame rail 104 is wider than typical. For example, the frame width could be greater than the typical 34 inches, which provides a greater opening between the frame rails 102, 104 for receiving various devices. In embodiments in which the vehicle is an EV, for example, the wider frame width allows a greater variety of battery sizes to be placed between the frame rails 102, 104. In some embodiments, the frame rails 102, 104 may include a kickup feature 105 in which the frame rails 102, 104 transition from wider to narrower (the web portion between the flanges) proximate the wheels 150 (as best seen in FIGS. 3 and 4).

As shown, the chassis 100 includes a rear suspension assembly with a first leaf spring 110 underneath the first frame rail 102. There is a second leaf spring 112 underneath the second frame rail 104. The longitudinal axis of the leaf springs 110, 112 are approximately parallel with the longitudinal axis of the respective frame rails 102, 104, but the leaf springs 110, 112 are underneath the respective frame rails 102, 104.

In this embodiment, the front portion of the first leaf spring 110 is connected to the first frame rail 102 with a first hanger bracket 114 (see FIGS. 3 and 4). The front portion of the second leaf spring 112 is connected to the second frame rail 104 with a second hanger bracket 116 (sec FIGS. 3 and 4). In the embodiment shown, the rear portion of the first leaf spring 110 is connected to the first frame rail 102 with a first rear shackle assembly 118. The rear portion of the second leaf spring 112 is shown connected to the second frame rail 104 with a second rear shackle assembly 120.

In the embodiment shown, the rear shackle assemblies 118, 120 straddle the respective frame rails 102, 104 to which they are connected. By straddling the rear shackles 118, 120 on the frame rails 102, 104, instead of mounting them outside the frame rails, this accommodates a wider frame construction because the leaf springs 110, 112 can be positioned below the frame rails 102, 104 instead of outside the frame rails 102, 104.

The first rear shackle assembly 118 includes links 122, 124 that pivotally connect the first leaf spring 110 and the first frame rail 102. As shown, the first link 122 is inside the first frame rail 102 (positioned between the frame rails 102, 104) and the second link 124 is outside the first frame rail 102 (positioned between the first frame rail 102 and wheels 150). The first link 122 has an upper portion that is pivotally mounted to the inside of the first frame rail 102 with a first shackle bracket 126, which is mounted to the inside of the first frame rail 102. The lower portion of the first link 122 is pivotally connected to an eyelet 128 of the first leaf spring 110. The second link 124 has an upper portion that is pivotally connected to an embossment 130 of the first shackle bracket 126 that extends through the first frame rail 102. In some embodiments, the embossment 130 extends from the first shackle bracket 126 through an opening defined through the first frame rail 102. The lower portion of the second link 124 is pivotally connected to the eyelet 128 of the first leaf spring 110.

The second rear shackle assembly 120 includes links 132, 134 that pivotally connect the second leaf spring 112 and the second frame rail 104. As shown, the first link 132 is inside the second frame rail 104 (positioned between the frame rails 102, 104) and the second link 134 is outside the second frame rail 104 (positioned between the second frame rail 104 and wheels 150). The first link 132 has an upper portion that is pivotally mounted to the inside of the second frame rail 104 with a second shackle bracket 136, which is mounted to the inside of the second frame rail 104. The lower portion of the first link 132 is pivotally connected to an eyelet 138 of the second leaf spring 112. The second link 134 has an upper portion that is pivotally connected to an embossment 140 of the second shackle bracket 136 that extends through the second frame rail 104. In some embodiments, the embossment 140 extends from the second shackle bracket 136 through an opening defined through the second frame rail 104. The lower portion of the second link 134 is pivotally connected to the eyelet 138 of the second leaf spring 112. Although the connections between the shackle assemblies 118, 120, the frame rails 102, 104 and leaf springs 110, 112 are shown connected with fasteners, such as bolts, it should be appreciated that these connections could be formed in a variety of ways, such as pin connections, adhesive, welding, etc.

In the example shown, there is a frame reinforcement 142 lined within the frame rails 102, 104 (best seen in FIGS. 3-4). As shown, the frame reinforcement 142 has a U-shape and is dimensioned to be received between the flanges of the frame rails 102, 104. As shown, there are reinforcement beams 144 that extend transversely between the frame rails 102, 104. In the example shown, the suspension includes shocks 146 connected with the frame rails 102, 104.

In some embodiments, there is a rear differential 148 between the frame rails 102, 104 that connect with rear wheels 150. Although this example is an EV chassis with a motor 152 for driving the rear wheels 150, the chassis is applicable to internal combustion engine vehicles. As discussed above, there are other vehicles, such as RVs, in which a wider frame could be beneficial.

The invention claimed is:

1. A vehicle chassis comprising:
   a first frame rail;
   a second frame rail, wherein the second frame rail extends approximately parallel with the first frame rail;
   a first leaf spring pivotally connected with the first frame rail;
   a second leaf spring pivotally connected with the second frame rail;
   a first shackle assembly pivotally connecting the first leaf spring with the first frame rail, wherein the first shackle straddles the first leaf spring, wherein the first shackle assembly includes a first link and a second link each pivotally connected with the first frame rail, wherein the first link is positioned on a first side of the first frame rail between the first frame rail and the second frame rail and the second link is positioned on a second side of the first frame rail opposing the first side, wherein the first shackle assembly includes a first shackle bracket connected with the first frame rail, wherein an upper portion of the first link is pivotally connected to the first shackle bracket and a lower portion of the first link is pivotally connected to the first leaf spring;
   a second shackle assembly pivotally connecting the second leaf spring with the second frame rail, wherein the second shackle straddles the second leaf spring, wherein the second shackle assembly includes a first link and a second link each pivotally connected with the second frame rail, wherein the first link is positioned on a first side of the second frame rail between the second frame rail and the first frame rail and the second link is positioned on a second side of the second frame rail opposing the first side, wherein the second shackle assembly includes a second shackle bracket connected with the second frame rail, wherein an upper portion of the first link is pivotally connected to the second shackle bracket and a lower portion of the first link is pivotally connected to the second leaf spring;
   wherein the first leaf spring extends longitudinally along an axis approximately parallel with a longitudinally extending axis of the first frame rail;
   wherein the second leaf spring extends longitudinally along an axis approximately parallel with a longitudinally extending axis of the second frame rail;
   wherein the first shackle bracket includes a planar portion attached to the first side of the first frame rail and an embossment that protrudes through the first side of the first frame rail to the opposing second side of the first frame rail and the upper portion of the second link of the first shackle assembly is pivotally connected to the embossment; and
   wherein the second shackle bracket includes a planar portion attached to the first side of the second frame rail and an embossment that protrudes through the first side of the second frame rail to the opposing second side of the second frame rail and the upper portion of the second link of the second shackle assembly is pivotally connected to the embossment.

2. The vehicle chassis of claim 1, wherein the first leaf spring is positioned underneath the first frame rail.

3. The vehicle chassis of claim 2, wherein the second leaf spring is positioned underneath the second frame rail.

4. The vehicle chassis of claim 3, wherein a first plane defined by a longitudinally extending axis of the first frame rail and a longitudinally extending axis of the first leaf spring is approximately parallel with a second plane defined by a longitudinally extending axis of the second frame rail and a longitudinally extending axis of the second leaf spring.

5. A vehicle chassis comprising:
   a first frame rail;
   a second frame rail, wherein the second frame rail extends approximately parallel with the first frame rail;
   a first leaf spring having a first end and a second end pivotally connected with the first frame rail;
   a second leaf spring having a first end and a second end pivotally connected with the second frame rail;
   a first hanger bracket connecting the first end of the first leaf spring to the first frame rail;
   a second hanger bracket connecting the first end of the second leaf spring to the second frame rail;
   a first shackle assembly connecting the second end of the first leaf spring with the first frame rail, wherein the first shackle straddles the first leaf spring, wherein the first shackle assembly includes a first link and a second link each pivotally connected with the first frame rail, wherein the first link is positioned on a first side of the first frame rail between the first frame rail and the second frame rail and the second link is positioned on a second side of the first frame rail opposing the first side, wherein the first shackle assembly includes a first shackle bracket connected with the first frame rail, wherein an upper portion of the first link is pivotally connected to the first shackle bracket and a lower portion of the first link is pivotally connected to the first leaf spring;

a second shackle assembly connecting the second end of the second leaf spring with the second frame rail, wherein the second shackle straddles the second leaf spring, wherein the second shackle assembly includes a first link and a second link each pivotally connected with the second frame rail, wherein the first link is positioned on a first side of the second frame rail between the second frame rail and the first frame rail and the second link is positioned on a second side of the second frame rail opposing the first side, wherein the second shackle assembly includes a second shackle bracket connected with the second frame rail, wherein an upper portion of the first link is pivotally connected to the second shackle bracket and a lower portion of the first link is pivotally connected to the second leaf spring;

wherein the first shackle bracket includes a planar portion attached to the first side of the first frame rail and an embossment that protrudes through the first side of the first frame rail to the opposing second side of the first frame rail and the upper portion of the second link of the first shackle assembly is pivotally connected to the embossment; and wherein the second shackle bracket includes a planar portion attached to the first side of the second frame rail and an embossment that protrudes through the first side of the second frame rail to the opposing second side of the second frame rail and the upper portion of the second link of the second shackle assembly is pivotally connected to the embossment.

\* \* \* \* \*